(12) United States Patent
Kahn (10) Patent No.: US 8,027,741 B2
(45) Date of Patent: Sep. 27, 2011

(54) SYSTEM AND METHOD OF IMPROVED KALMAN FILTERING FOR ESTIMATING THE STATE OF A DYNAMIC SYSTEM

(75) Inventor: Aaron D. Kahn, Arlington, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 399 days.

(21) Appl. No.: 12/432,809

(22) Filed: Apr. 30, 2009

(65) Prior Publication Data
US 2009/0299494 A1 Dec. 3, 2009

Related U.S. Application Data

(60) Provisional application No. 61/056,851, filed on May 29, 2008.

(51) Int. Cl.
*G06F 19/00* (2011.01)
(52) U.S. Cl. ............. 700/28; 700/54; 702/155; 702/175
(58) Field of Classification Search ............ 700/28, 700/54; 702/155, 175
See application file for complete search history.

(56) References Cited

U.S. PATENT DOCUMENTS

| | | | |
|---|---|---|---|
| 4,148,029 A * | 4/1979 | Quesinberry | 342/106 |
| 4,179,696 A * | 12/1979 | Quesinberry et al. | 342/75 |
| 5,019,824 A | 5/1991 | Kumar | |
| 5,406,488 A | 4/1995 | Booth | |
| 5,555,190 A | 9/1996 | Derby et al. | |
| 5,627,768 A | 5/1997 | Uhlmann | |
| 5,959,861 A * | 9/1999 | Kaneko | 700/29 |
| 5,991,525 A * | 11/1999 | Shah et al. | 703/2 |
| 5,995,620 A | 11/1999 | Wigren | |
| 6,081,230 A | 6/2000 | Hoshino et al. | |
| 6,104,703 A | 8/2000 | Sobiski et al. | |
| 6,157,891 A | 12/2000 | Lin | |
| 6,285,971 B1 * | 9/2001 | Shah et al. | 703/2 |
| 6,480,789 B2 | 11/2002 | Lin | |
| 6,493,650 B1 | 12/2002 | Rodgers et al. | |
| 6,573,486 B1 * | 6/2003 | Ratkovic et al. | 244/3.2 |

(Continued)

FOREIGN PATENT DOCUMENTS
WO WO-/2007/003680 1/2007

OTHER PUBLICATIONS

"On optimization of sensor selection for aircraft gas turbine engines", Mushini et al, 18th INternational Conference on Systems Engineering, IEEE 2005.*

(Continued)

*Primary Examiner* — Michael D Masinick
(74) *Attorney, Agent, or Firm* — Amy L. Ressing; Sally A. Ferrett (57) ABSTRACT

Embodiments include systems and methods of estimating at least one state of a modeled dynamic system. In particular, in one embodiment, an observer such as an extended Kalman filter is used to estimate the state of a modeled dynamic system. A covariance matrix associated with state variables of the observer is periodically checked for compliance with a specified condition, e.g., positive definiteness. If the matrix deviates from the specified condition, the matrix is set to a specified value.

22 Claims, 8 Drawing Sheets

U.S. PATENT DOCUMENTS

| | | | |
|---|---|---|---|
| 6,625,569 B2 * | 9/2003 | James et al. | 702/183 |
| 6,691,066 B1 | 2/2004 | Brodie | |
| 6,757,579 B1 * | 6/2004 | Pasadyn | 700/108 |
| 7,127,439 B2 * | 10/2006 | Jannarone et al. | 706/25 |
| 7,260,501 B2 * | 8/2007 | Pattipatti et al. | 702/183 |
| 7,536,277 B2 * | 5/2009 | Pattipatti et al. | 702/183 |
| 2002/0047799 A1 | 4/2002 | Gustafson et al. | |
| 2003/0014692 A1 * | 1/2003 | James et al. | 714/25 |
| 2005/0114023 A1 * | 5/2005 | Williamson et al. | 701/214 |
| 2009/0299494 A1 * | 12/2009 | Kahn | 700/28 |

OTHER PUBLICATIONS

"Order-Recursive Factorization of the Pseudoinverse of a Covariance Matrix", Larimore, Member IEEE, IEEE Transactions on Automatic Control, vol. 35, No. 12, Dec. 1990.*

Rotea, M.; Lana, C.; , "State Estimation with Probability Constraints," Decision and Control, 2005 and 2005 European Control Conference. CDC-ECC '05. 44th IEEE Conference on , vol., no., pp. 380- 385, Dec. 12-15, 2005.*

* cited by examiner

SYSTEM AND METHOD OF IMPROVED KALMAN FILTERING FOR ESTIMATING THE STATE OF A DYNAMIC SYSTEM

CROSS REFERENCE TO RELATED APPLICATIONS

This application claims the benefit of, and incorporates by reference in its entirety U.S. Provisional Patent Application No. 61/056,851, entitled "Extended Kalman Filter Covariance Matrix Integrity Check," and filed on May 29, 2008.

BACKGROUND OF THE INVENTION

1. Field of the Invention

The present invention relates to systems and methods for estimating the state of a dynamic system, such as a flight control system.

2. Description of the Related Technology

Kalman filters and other similar techniques are used to provide an electronic "observer" that transforms sensor data, which is indicative of the state of a modeled dynamic system at an instant in time, but subject to measurement and other errors, into an estimate of the state of the system. Such observers are used by flight control or other control systems to generate control signals for controlling the subject system. Modeled dynamic systems may include aircraft, spacecraft, or any other point mass moving in an inertial space.

In many applications, processors implementing such observers have limited computational power. Hence, a need exists for improved electronic system observers.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include implementation of an electronic observer, e.g., an extended Kalman filter, that may, for example, be implemented using a low computational power processor.

One embodiment includes a method of estimating the state of a modeled dynamic system. The method includes generating an observer in an electronic device for estimating of at least one state variable associated with the system. The observer defines a covariance matrix statistically relating the at least one state variable. The method further includes receiving sensor data at a electronic device from a sensor. The sensor data is associated with the at least one state variable. The method further includes updating, in a memory of the electronic device, the at least one state variable based on the received sensor data and the generated observer, updating, in a memory of the electronic device, the covariance matrix based on the updated at least one state variable, determining whether an element of the main diagonal of the updated covariance matrix has a value that is less than zero, and storing a specified value to the covariance matrix in the memory of the electronic device based on the determining.

One embodiment includes a system for estimating at least one state of a modeled dynamic system. The system includes a processor configured to provide an observer configured to estimate at least one state variable associated with the modeled dynamic system. The observer defines a covariance matrix statistically relating the at least one state variable. The system further comprises a memory configured to store data associated with the observer. The stored data comprises the at least one state variable and the covariance matrix. The processor is further configured to receive sensor data in electronic form from a sensor. The sensor data is associated with the at least one state variable. The processor is further configured to update, in the memory, the at least one state variable of the observer based on the received sensor data, update the covariance matrix in the memory based on the updated at least one state variable, determine whether an element of the main diagonal of the updated covariance matrix has a value that is less than zero, and store a specified value to the covariance matrix in the memory of the computer system based on the determination.

One embodiment includes a system for estimating at least one state of a modeled dynamic system. The system includes a means for processing configured to provide an observer configured to estimate at least one state variable associated with the modeled dynamic system. The observer defines a covariance matrix statistically relating the at least one state variable. The system further includes means for storing data associated with the observer. The stored data comprises the at least one state variable and the covariance matrix. The processing means is further configured to receive sensor data in electronic form from a sensor, the sensor data being associated with the at least one state variable, update, in the storing means, the at least one state variable of the observer based on the received sensor data, update the covariance matrix in the memory based on the updated at least one state variable, determine whether an element of the main diagonal of the updated covariance matrix has a value that is less than zero, and store a specified value to the covariance matrix in the storing means based on the determination.

Another embodiment includes a computer-program product for estimating the state of a modeled dynamic system. The product includes a computer-readable medium having stored thereon codes executable by at least one processor to perform the method comprising generating an observer in an electronic device for estimating of at least one state variable associated with the system. The observer defines a covariance matrix statistically relating the at least one state variable. The performed method further includes receiving sensor data at a electronic device from a sensor, the sensor data being associated with the at least one state variable, updating, in a memory of the electronic device, the at least one state variable based on the received sensor data and the generated observer, updating, in a memory of the electronic device, the covariance matrix based on the updated at least one state variable, determining whether an element of the main diagonal of the updated covariance matrix has a value that is less than zero, and storing a specified value to the covariance matrix in the memory of the electronic device based on the determining.

DETAILED DESCRIPTION OF CERTAIN EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

One embodiment is a system and method of updating an estimate of at least one state variable of a modeled dynamic system. In particular, updating a Kalman filter, and for example, extended Kalman filter, can be computationally complex. However, in many applications it is desirable to use a processor that is lower power, lower complexity, and accordingly lower performance. Due to the nature of implementation of extended Kalman filters on a digital computer, errors can accumulate during numerical integration and linearization portions of the filter process. For example, such errors may be especially noticeable if the dynamics being modeled and integrated are fast relative to the integration time step.

As discussed herein, an extended Kalman filter is a type of "observer," that helps to estimate the state variables of a dynamical system. For example, in general, individual state variables of a dynamic system cannot be determined exactly by direct measurements. Rather measurements associated with the state variables, e.g., sensor data in a control system, may be a function of the state variables. In addition, such measurements are generally subject to measurement error, which, in one embodiment, may be modeled as random noise. Further, the system itself may also be subjected to random or other disturbances. The Kalman filter estimates the state variables based on the noisy measurements.

In one embodiment, the Kalman filter comprises a covariance matrix having a positive definiteness condition, e.g., the main diagonal of the covariance matrix has elements that are positive. However, one result of the discussed computation errors in updating a Kalman filter can be the non-positive definiteness of the covariance matrix. If this positive definiteness condition is lost, the Kalman gain, which is computed using the covariance matrix, results in an unstable system. Methods and systems such as the square-root extended Kalman filter can be used to minimize such errors. However, such methods are computationally complex and hence difficult or costly to implement in many embedded control systems.

Embodiments include a method and system that includes periodically checking the covariance matrix to determine if any of the elements of the main diagonal of the covariance matrix are less than zero (non-positive). If so, the covariance matrix is set to a known state, e.g., the elements of the covariance matrix are re-initialized to a particular set of values to maintain the strict positive definiteness of the covariance matrix during operation of the filter. While mathematically less rigorous than methods such as the square root Kalman filter, such a method and system can be implemented using a lower performance and/or lower cost processor.

Figure 1:
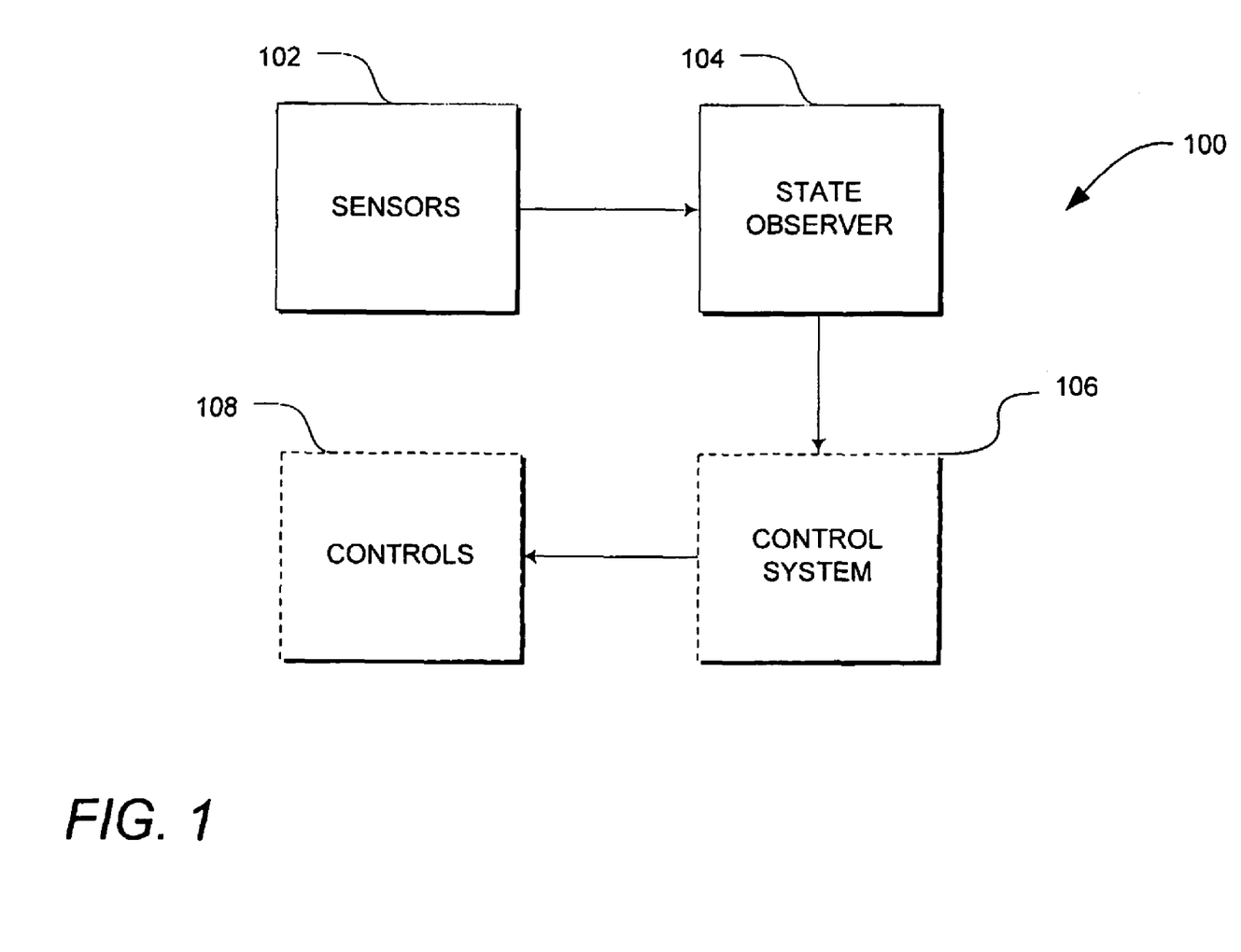
FIG. 1 is a block diagram illustrating one embodiment of a control system according to one embodiment.

FIG. 1 is a block diagram illustrating one embodiment of a system 100 according to one embodiment. The system 100 comprises one or more sensors 102 that provide data to an electronic state observer 104. In one embodiment, the state observer 104 outputs a state, e.g., a real valued array of state variables, to control system 106, which outputs signals to one or more controls 108 based on the state output by the state observer 104.

In one embodiment, the system 100 comprises a control system of an aircraft or spacecraft. In such embodiments, the sensors 102 may comprise for example, one or more of attitude, velocity, position, altitude, etc. while the controls 108 may comprise control surfaces, engine controls, etc. The state observer 104 may comprise an extended Kalman filter and/or any other suitable state observer having a corresponding covariance matrix for which positive definiteness is to be maintained in order to maintain filter stability. In one such embodiment, the control system 106 receives aircraft state data from the extended Kalman filter, which uses data from the sensors 102 to update its estimate one or more state variables associated with the aircraft. The control system 106 generates control signals to the controls 108 of the aircraft to achieve a selected control operation.

It is to be recognized that while certain embodiments may comprise aircraft or spacecraft control systems, other embodiments may include any suitable control or tracking system modeling any other system including any other dynamic modeled system comprising a point mass moving in an inertial space.

Figure 2:
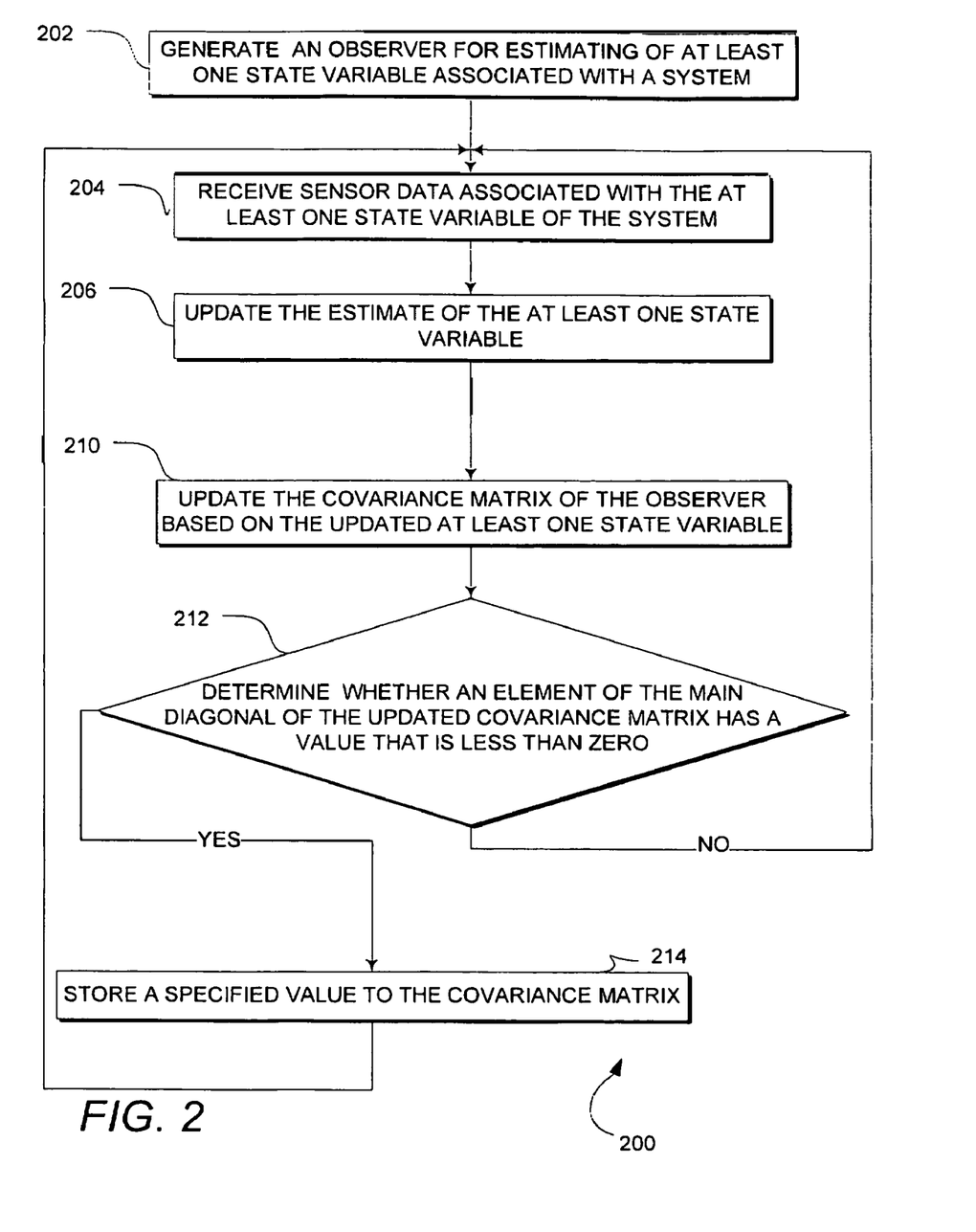
FIG. 2 is a flowchart illustrating one embodiment of a method of estimating the state of a system such as illustrated in FIG. 1.

FIG. 2 is a flowchart illustrating one embodiment of a method 200 of estimating the state of a system such as the system 100 of FIG. 1. The method 200 begins at a block 202 in which the system 100 generates an observer, e.g., a Kalman filter, or extended Kalman filter in non-linear estimating of at least one state variable associated with a system.

The Kalman filter (or other observer 104) provides periodically updated state variables given a sequence of observations (sensor data) about those state variables. The data from the sensors 102 generally includes some error or noise, such as measurement errors that can depend on the sensor, the operational environment, the nature of the measured value, etc. The Kalman filter helps to remove the effects of the errors to estimate the state variables of the system. The Kalman filter is a recursive estimator or state observer. Hence, the estimated state from the previous step and a new sensor measurement are used to compute the estimate for the current state. A Kalman filter is used in two steps, a prediction step and an update step. The prediction step uses the state estimate from the previous timestep to produce an estimate of the state at the current timestep. In the update step, sensor measurement information at the current timestep is used to refine this prediction to arrive at a new, state estimate, again for the current timestep. In one embodiment, the observer 104 may be represented mathematically as a Kalman filter as follows:

$$X \in \Re^n$$

$$P \in \Re^{n \times n}$$

$$A \in \Re^{n \times n}$$

$$Q \in \Re^{n \times n}$$

$$P > 0$$

$$Q \geq 0$$

where the n element vector represents the state of the modeled dynamic process (with n state variables), the n×n matrix P is the covariance matrix, as statistical measure relating each state variable to itself and the other state variables and indicative of the accuracy of the state estimates, A is the system matrix indicative of state transitions from time t to t+Δt—of the modeled dynamic system, and Q is the process noise matrix of the filter. In one embodiment, the observer 104 is implemented on an electronic device such that some or all of the numerical values of the implemented Kalman filter are expressed as real-valued numerical elements. For example, the matrices, P, X, Q, A are matrices of real-valued numbers.

Hence, moving to a block 204, the observer 104 receives the data from the sensors 102. Next at a block 206, the observer 104 begins the update of the observer 104 based on the sensor data by updating of at least one state variable of the system based on the sensor data. For example, if the state matrix of an extended Kalman filter is represented by A, the predicted state may be generated based on:

$$X_{t+\Delta t|t} \propto A_{t+\Delta t} X_{t|t-\Delta t},$$

e.g., in accordance with updating of an extended Kalman filter. It is to be recognized that the updated state $X_{t+\Delta t|t}$ may be further based on a control model.

Next at a block 210, the covariance matrix of the observer 104 is updated according to the following, e.g., in accordance with an extended Kalman filter:

$$\dot{P} = AP + PA^T + Q$$

$$P_{t+\Delta t} = P_t + \dot{P} \cdot \Delta t$$

where $\dot{P}$ is the time derivative of P, and Δt is the numerical integration time step which the observer 104 is updated.

Proceeding to a decision block 212, the observer 104 determines whether an element of the main diagonal of the updated covariance matrix $P_{t+\Delta t}$ has a value that is less than zero, e.g., whether the covariance matrix invariant that it is both symmetric and positive definite is maintained and thus all of the elements on the main diagonal are greater than zero. If any of these elements are found to violate this condition, the method 200 proceeds to a block 214 in which the observer 104 stores a specified value to the covariance matrix. In one embodiment, entire covariance matrix is reset to a known value, $P_{init}$. If at the block 212, the positive definite condition of the covariance matrix $P_{t+\Delta t}$ is maintained, the method 200 returns to the block 204 to update the state after the next time interval Δt.

In an alternative embodiment, the block 214 may comprise simply resetting just the row and column of the diagonal element that is violating the positive rule instead of resetting the entire covariance matrix. However, it has been found by experiment that such an embodiment does not provide stability of the system to the same extent as resetting the entire matrix.

Desirably, the extended Kalman filter can be implemented on small processor footprints while still providing a guarantee of numerical safety of the filter. During experiments, embodiments of the method 200 have allowed extended Kalman filter formulations to be exposed to high dynamic environments without the state estimate diverging.

For example, in flight critical applications the flight control system is dependant on a reliable source of vehicle state information of successful operation and divergence can result in failure of the flight control system. Hence, improved reliability is obtained without the increased computational and other resource requirements of other more mathematically complex solutions.

Figure 3:
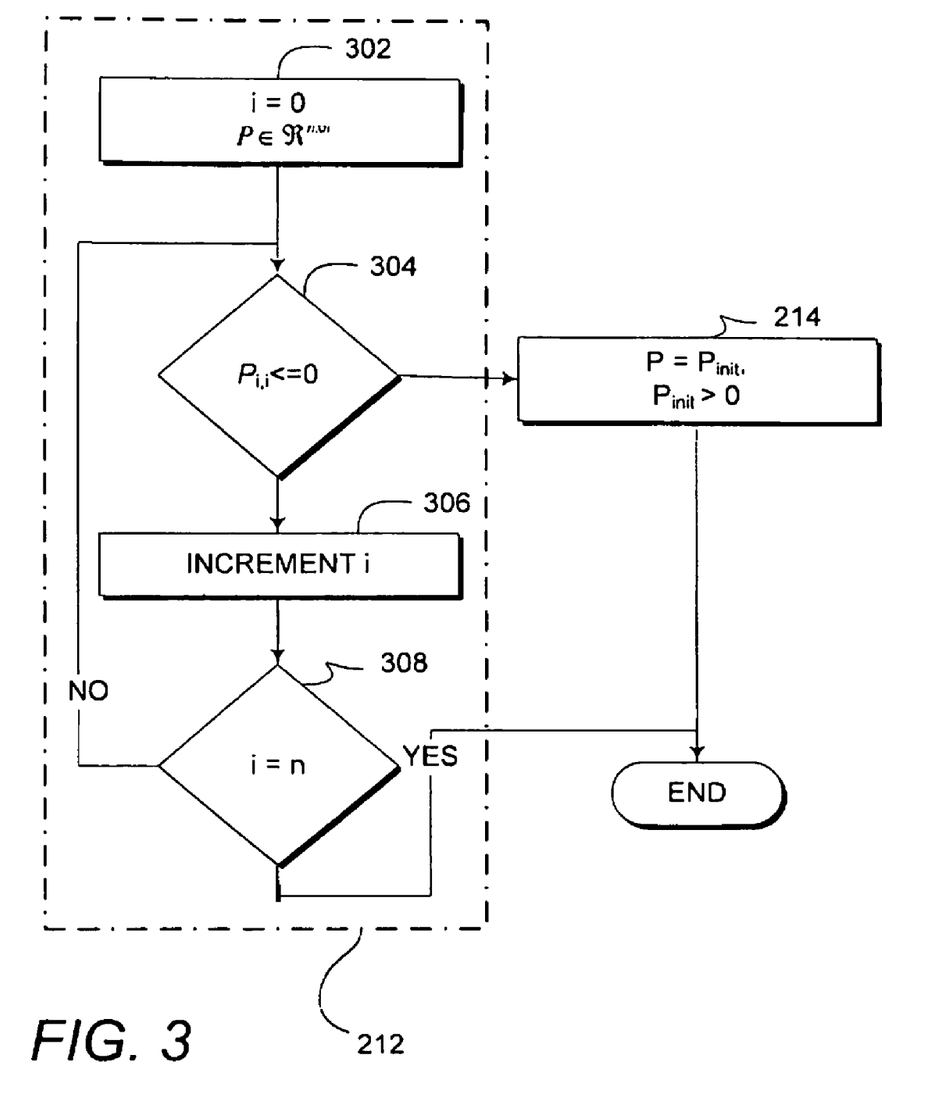
FIG. 3 is a flowchart illustrating portions of the method of FIG. 2 in more detail.

FIG. 3 is a flowchart illustrating one embodiment of portions of the method 200 of FIG. 2 in more detail. In particular, FIG. 3 illustrates the acts associated with maintaining the positive definiteness of the covariance matrix P at blocks 212 and 214 of FIG. 2 in more detail. At a block 302, the observer 104, an iterator, i, is set to 0 to indicate the first row of the covariance matrix, P. Next at a block 304, the observer 104 determines whether the main diagonal element (i,i) is positive definite, e.g., that $P_{i,i} <= 0$. If so, the process moves to a block 306 in which the iterator, i, is incremented. Next at a block 308, if the iterator equals the number n of rows/columns in the matrix P, the process ends, otherwise the process returns to the block 302.

Returning to the block 304, if the element (i,i) indicates that the matrix P is not positive definite, the process moves to the block 214 in which the matrix is reset to a state $P_{init}$, which in one embodiment is the values of the covariance matrix P at the block 202 of the method 200 in which the covariance matrix is initialized.

Figure 4:
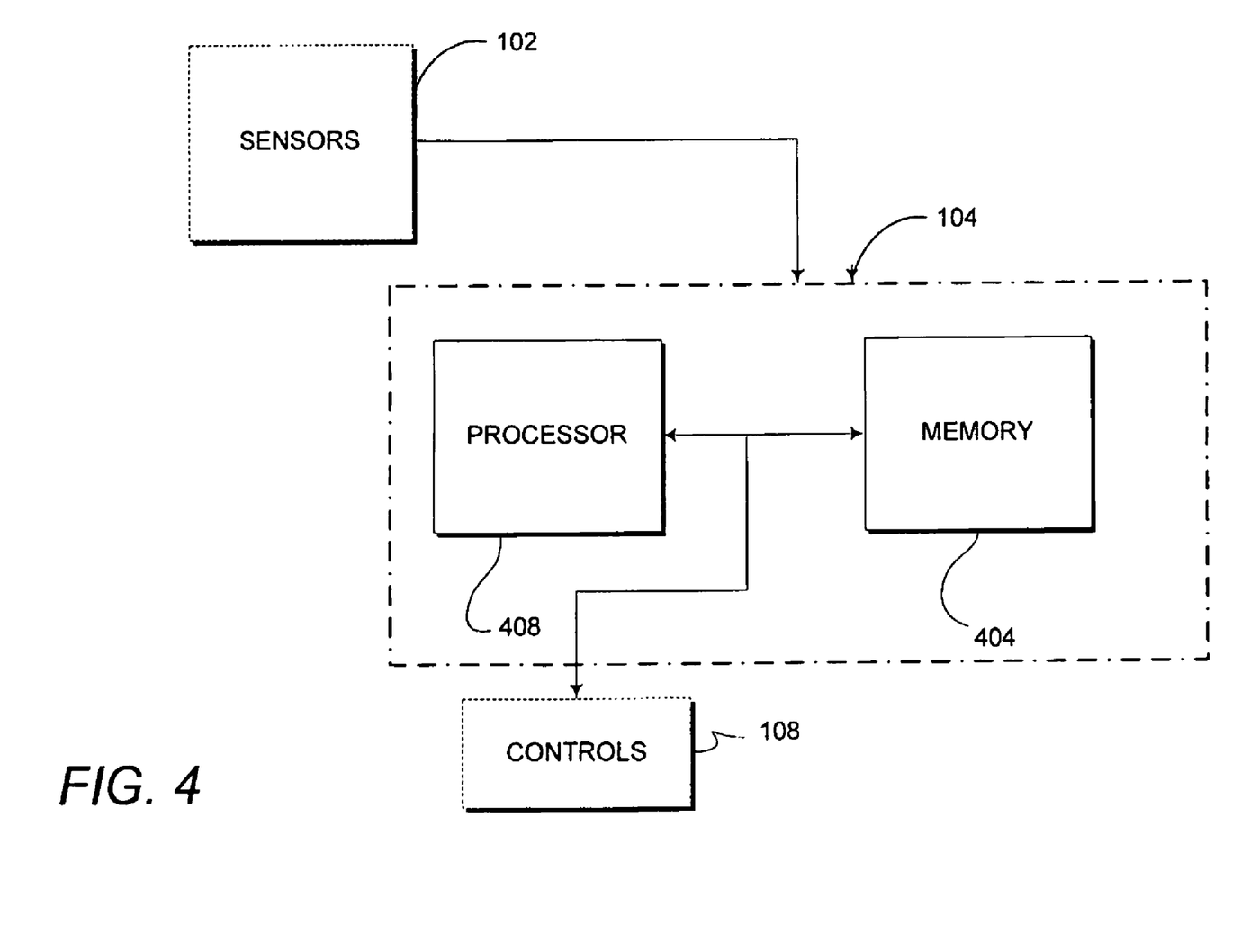
FIG. 4 is a block diagram illustrating one embodiment of the system of FIG. 1 in more detail.

FIG. 4 is a block diagram illustrating one embodiment of the system 100 of FIG. 1 in more detail. In particular, FIG. 4 illustrates one embodiment of the system 100 in which the observer 104 is implemented by one or more processors 402 in communication with a memory 404. In one embodiment, one or more buses communicate data between the processor(s) 402 and the memory 404. Such buses may also be configured to communicate data from the sensors 102 and/or the control system 108. In one embodiment, the processor(s) 402 and the memory 404 also at least partly implement the control system 108.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Figure 5:
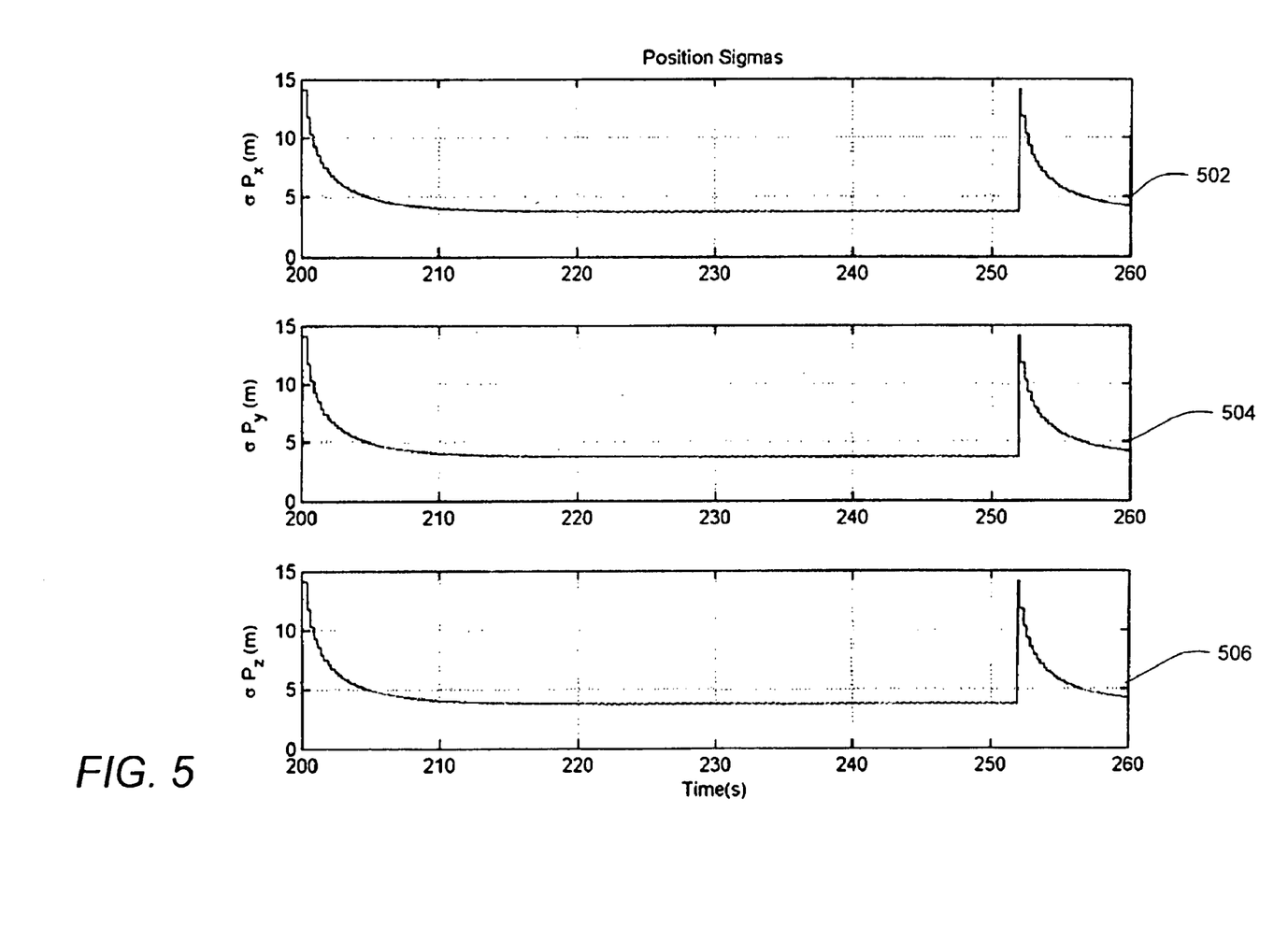
FIG. 5 provides example data plots illustrating position covariance elements during operation according to one embodiment of a system such as illustrated in FIG. 1.
Figure 6:
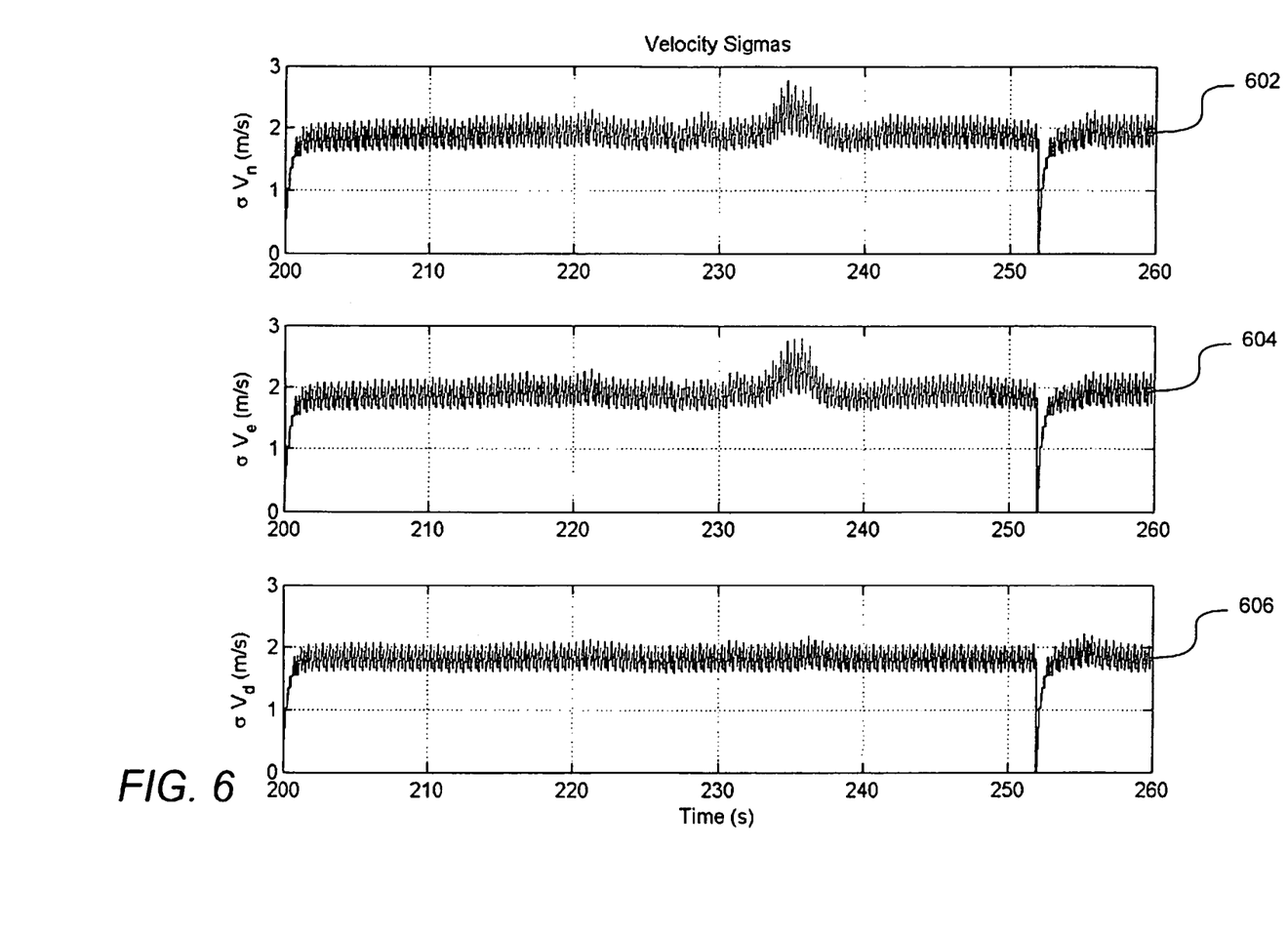
FIG. 6 provides example data plots illustrating velocity covariance elements during operation in a period corresponding to that of FIG. 5 according to one embodiment.
Figure 7:
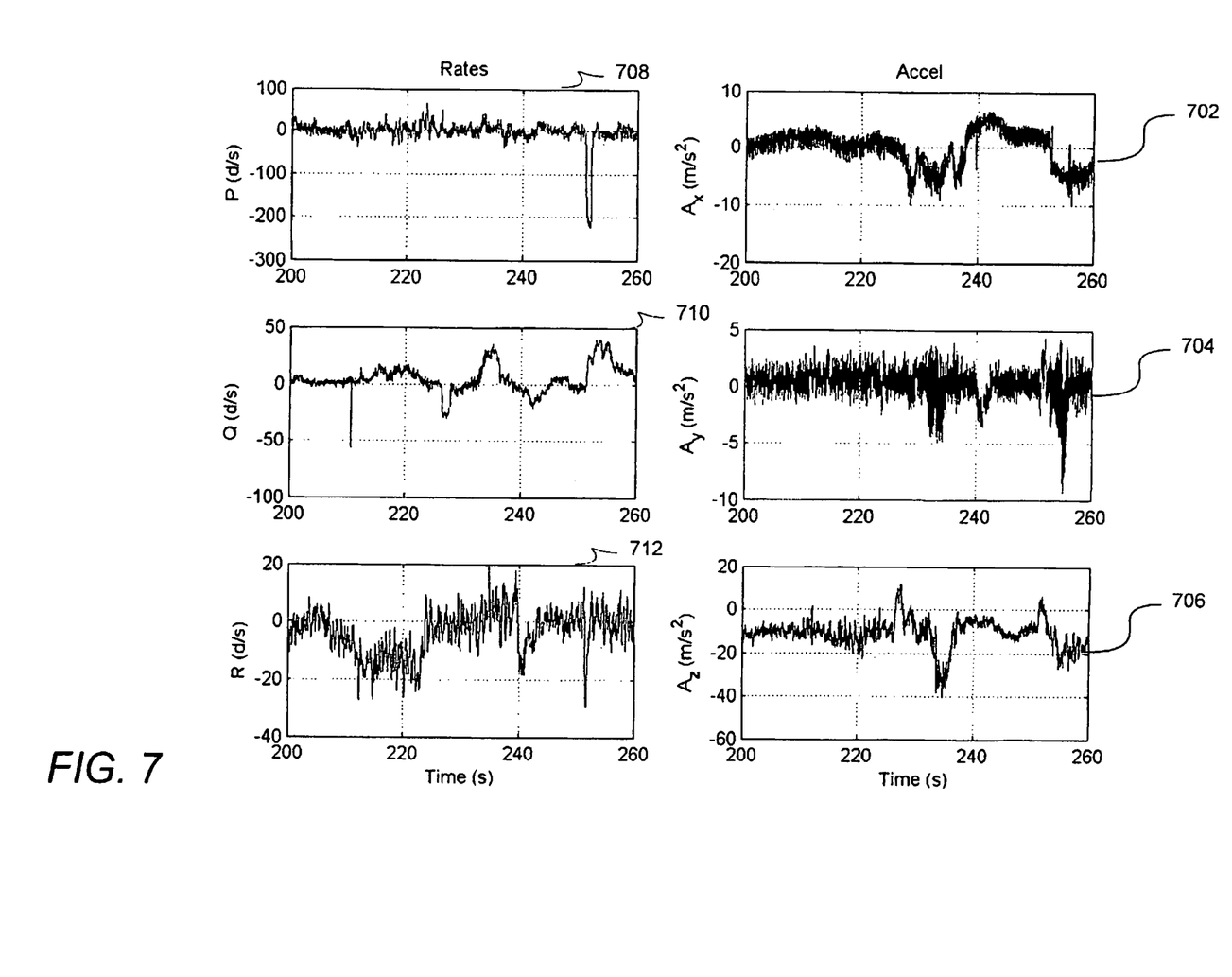
FIG. 7 provides example data plots illustrating operational inertial measurement unit outputs for various variables during the period corresponding to that of FIGS. 5 and 6.

FIGS. 5-8 provide data plots of operational data during a 260 second period of an embodiment of the system 100. This period includes a covariance matrix reset as discussed above in detail with reference to FIGS. 2 and 3. FIG. 5 provides example data plots illustrating position covariance elements during operation according to one embodiment of the system 100. Plots 502, 504, and 506 respectively illustrate x,y, and z axis position. FIG. 6 illustrates the corresponding velocity sigmas in three dimensions via the plots 602, 604 and 606. FIG. 7 illustrates the corresponding accelerations 702, 704, and 706 and rates of change or pitch, yaw, and roll 708, 710, and 712 in three dimensions. In the illustrated operational time period illustrated in FIG. 5-8, a covariance reset can be seen in at time 255 seconds in the data of FIGS. 5-7. In this example, the reset was caused by the numerical error due to the illustrated high dynamics. The vehicle that included this embodiment of the system 100 at this point was commanded to roll at an angular velocity of over 200 degrees per second, as shown in the rate measurements in FIG. 5. Because of the protection provided by the invention, the state output remained stable.

Figure 8:
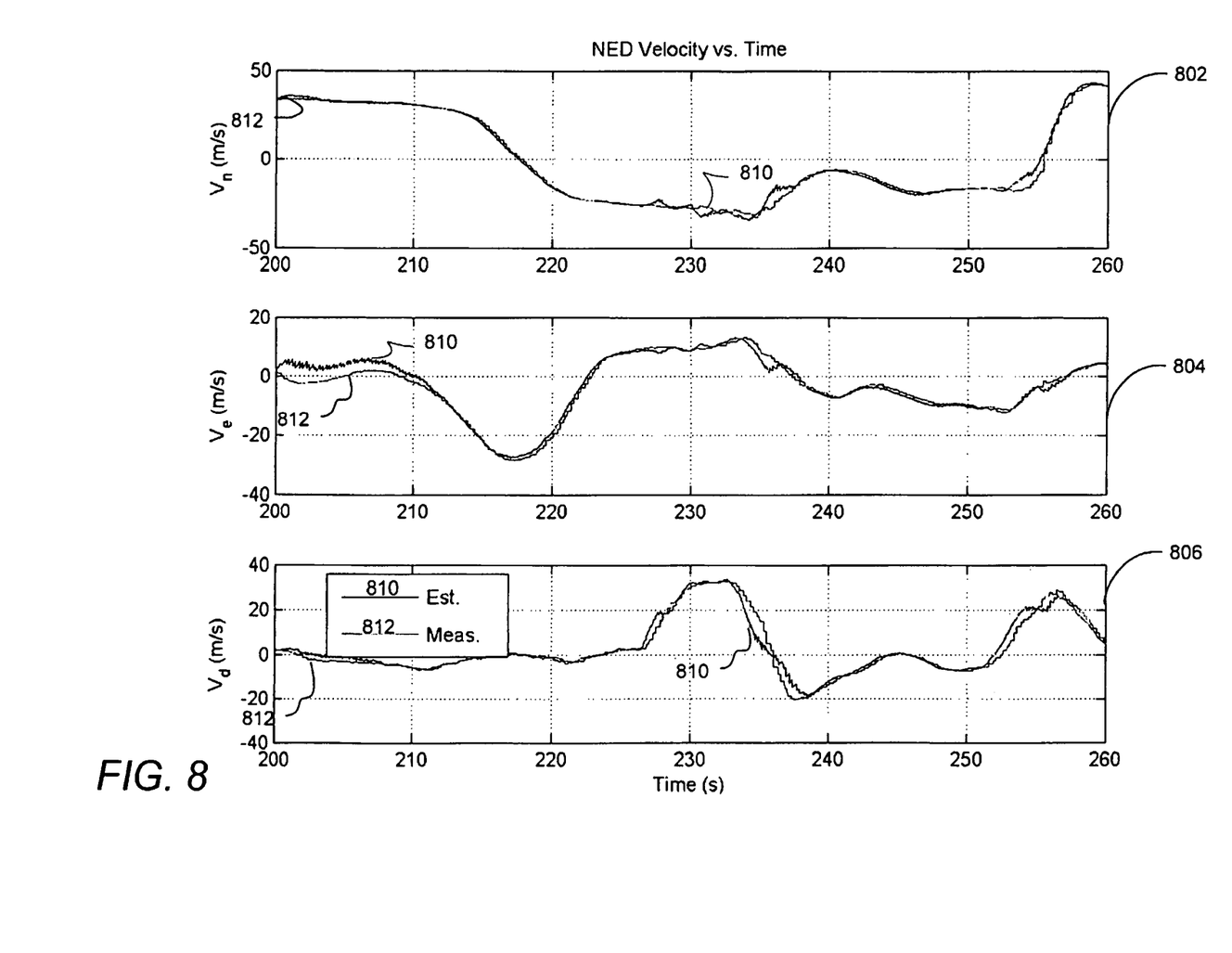
FIG. 8 provides example data plots illustrating operational position states during the period corresponding to that of FIGS. 5-7.

FIG. 8 presents the position states as an example of this stability. In particular, a trace 810 illustrates estimated position while a trace 812 illustrates measured position. As can be seen, the two traces 810 and 812 closely track throughout the time period illustrating the stability of the estimates.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of estimating the state of a modeled dynamic system, the method comprising:
generating an observer in an electronic device for estimating of at least one state variable associated with the system,
wherein said observer defines a covariance matrix statistically relating the at least one state variable;
receiving sensor data at a electronic device from a sensor, the sensor data being associated with the at least one state variable;
updating, in a memory of the electronic device, the at least one state variable based on the received sensor data and the generated observer;
updating, in a memory of the electronic device, the covariance matrix based on the updated at least one state variable;
determining whether an element of the main diagonal of the updated covariance matrix has a value that is less than zero; and
storing a specified value to the covariance matrix in the memory of the electronic device based on the determining.

2. The method of claim 1, further comprising outputting a vector of real-valued numerical elements which are based on the updated at least one state variable.

3. The method of claim 2, further comprising outputting a control signal based on the vector.

4. The method of claim 1, wherein the observer comprises at least one of a Kalman filter or an extended Kalman filter.

5. The method of claim 1, wherein the modeled dynamical system comprises a point mass moving in inertial space.

6. The method of claim 5, wherein the modeled dynamical system comprises a vehicle, said vehicle comprising least one of an aircraft or a spacecraft.

7. The method of claim 6, wherein the sensor data comprises flight sensor data, and wherein the at least one state variable is indicative of a state variable of the aircraft.

8. A system for estimating at least one state of a modeled dynamic system, the system comprising:
a processor configured to:
provide an observer configured to estimate at least one state variable associated with the modeled dynamic system,
wherein said observer defines a covariance matrix statistically relating the at least one state variable;
a memory configured to store data associated with the observer, said stored data comprising the at least one state variable and the covariance matrix;
wherein the processor is further configured to:
receive sensor data in electronic form from a sensor, the sensor data being associated with the at least one state variable;
update, in the memory, the at least one state variable of the observer based on the received sensor data;
update the covariance matrix in the memory based on the updated at least one state variable;
determine whether an element of the main diagonal of the updated covariance matrix has a value that is less than zero; and
store a specified value to the covariance matrix in the memory based on the determination.

9. The system of claim 8, wherein the processor is configured to output a vector of real-valued numerical elements which are based on the updated at least one state variable.

10. The system of claim 9, further comprising a control system configured to control the modeled dynamic system based on the output vector.

11. The system of claim 8, wherein the observer comprises at least one of a Kalman filter or an extended Kalman filter.

12. The system of claim 8, wherein the modeled dynamic system comprises a point mass moving in inertial space.

13. The system of claim 12, wherein the modeled dynamic system comprises a vehicle, said vehicle comprising least one of an aircraft or a spacecraft.

14. The system of claim 13, wherein the sensor data comprises flight sensor data, and wherein the at least one state variable is indicative of a state variable of an aircraft.

15. A computer-program product for estimating the state of a modeled dynamic system, comprising:
- a computer-readable medium having stored thereon codes executable by at least one processor to perform the method comprising:
  - generating an observer in an electronic device for estimating of at least one state variable associated with the system,
  - wherein said observer defines a covariance matrix statistically relating the at least one state variable;
  - receiving sensor data at a electronic device from a sensor, the sensor data being associated with the at least one state variable;
  - updating, in a memory of the electronic device, the at least one state variable based on the received sensor data and the generated observer;
  - updating, in a memory of the electronic device, the covariance matrix based on the updated at least one state variable;
  - determining whether an element of the main diagonal of the updated covariance matrix has a value that is less than zero; and
  - storing a specified value to the covariance matrix in the memory of the electronic device based on the determining.

16. The product of claim 15, wherein the executable codes further comprise codes executable by the processor to further perform outputting a vector of real-valued numerical elements which are based on the updated at least one state variable.

17. The product of claim 16, wherein the executable codes further comprise codes executable by the processor to further perform outputting a control signal based on the output vector.

18. The product of claim 15, wherein the observer comprises at least one of a Kalman filter or an extended Kalman filter.

19. The product of claim 15, wherein the modeled dynamical system comprises a point mass moving in inertial space.

20. The product of claim 19, wherein the modeled dynamical system comprises a vehicle, said vehicle comprising least one of an aircraft or a spacecraft.

21. The product of claim 20, wherein the sensor data comprises flight sensor data, and wherein the at least one state variable is indicative of a state variable of the aircraft.

22. A system for estimating at least one state of a modeled dynamic system, the system comprising:
- means for processing configured to:
  - provide an observer configured to estimate the at least one state variable associated with the modeled dynamic system,
  - wherein said observer defines a covariance matrix statistically relating the at least one state variable;
- means for storing data associated with the observer, said stored data comprising the at least one state variable and the covariance matrix;
- wherein the processing means is further configured to:
  - receive sensor data in electronic form from a sensor, the sensor data being associated with the at least one state variable;
  - update, in the memory, the at least one state variable of the observer based on the received sensor data;
  - update the covariance matrix in the storing means based on the updated at least one state variable;
  - determine whether an element of the main diagonal of the updated covariance matrix has a value that is less than zero; and
  - store a specified value to the covariance matrix in the storing means based on the determination.

* * * * *